United States Patent Office 3,090,664
Patented May 21, 1963

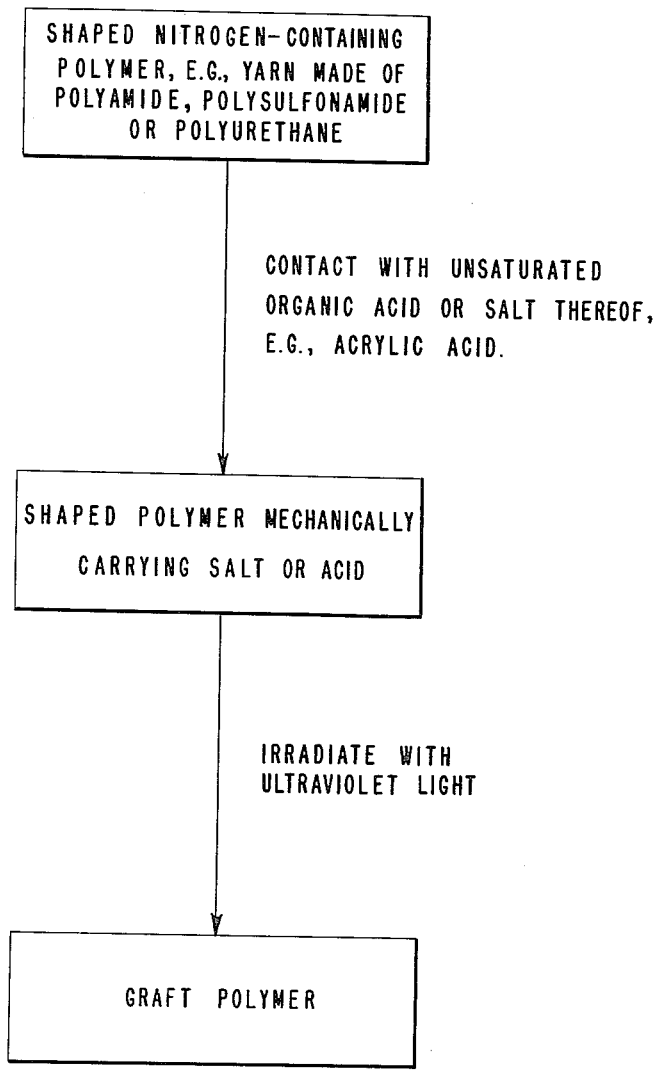

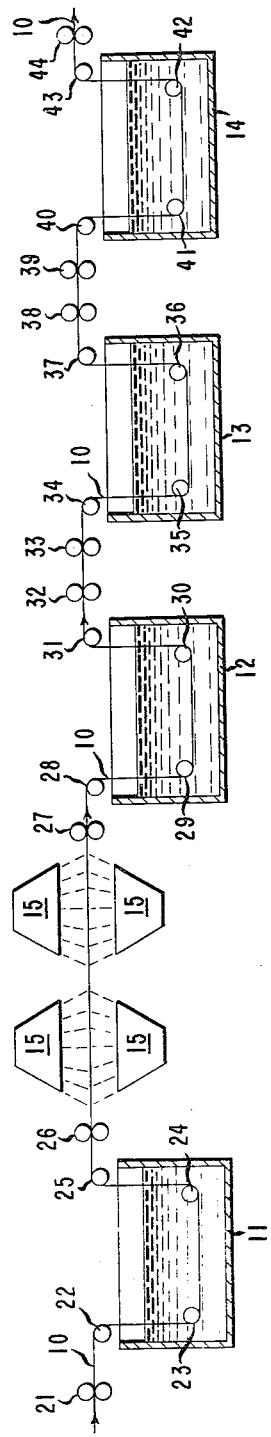

3,090,664
GRAFT POLYMERIZING AN UNSATURATED ORGANIC ACID OR SALT THEREOF ONTO A NITROGEN CONTAINING POLYMER SUBSTRATE
Edward T. Cline and David Tanner, Wilmington, Del., assignors to E. I. du Pont de Nemours and Company, Wilmington, Del., a corporation of Delaware
Filed Mar. 31, 1958, Ser. No. 725,115
16 Claims. (Cl. 8—115.5)

This invention is concerned with a new process for improving the static resistance and the hole melting resistance of shaped nitrogen-containing polymer structures.

Modified polymeric structures have been prepared by intimately contacting such a structure with an unsaturated organic acid or its salt and then subjecting the composition to ionizing radiation to cause adherence among the composition components. In addition, modified polyamide structures have been prepared by penetrating the polyamide structure with a polymerizable acidic vinyl compound, with or without an added thermal polymerization intiator, initiating polymerization uniformly throughout the penetrated area by exposure to heat and thereafter forming the salt of the grafted acid.

The salt forms of the grafted products obtained by these processes are characterized by excellent resistance to static accumulation as indicated by a low surface electrical resistivity and by a marked improvement in the resistance to hole melting on contact with heated objects.

An object of the present invention is provision of a novel process for improving the properties of shaped nitrogen-containing polymer structures.

Another object is provision of a process for making graft polymers of nitrogen-containing substrates under conditions milder than some heretofore employed.

A further object is provision of a novel process for making graft polymers based on nitrogen-containing substrates in a cheap and easily-accomplished manner.

In accordance with the above-mentioned and yet other objects, in the present invention graft polymers are broadly formed by chemically bonding an unsaturated organic acid or salt thereof (the acid being subsequently converted to the salt if desired) to a shape preformed of a nitrogen-containing polymer. The invention will be understood in more detail from the remainder of the specification and from the drawings, wherein the same numeral represents the same or identical parts and in which:

FIGURE 1 is a self-evident flowsheet of one embodiment of the process of the invention; and FIGURE 2 shows schematically apparatus upon which an embodiment of the process can be accomplished continuously.

In the embodiment of the invention shown by the figures, a process is provided for preparing nitrogen-containing polymers modified throughout their bulk by grafted unsaturated organic acids or their salts which comprises uniformly impregnating a shaped structure of a nitrogen-containing polymer with a polymerizable unsaturated organic acid or salt thereof and exposing the impregnated shaped structure to ultraviolet light for an exposure sufficient to effect grafting of a substantial amount of the acid or salt throughout the macro-bulk of the nitrogen-containing polymer. Where a polymerizable unsaturated organic acid is employed, the salt thereof may be formed subsequently.

In an alternative embodiment of the invention, the grafting process is carried out in two steps by first activating the nitrogen-containing polymer by exposure to ultraviolet light and then impregnating the activated polymer with a polymerizable unsaturated organic acid or salt. This procedure is particularly useful in a grafting operation where ultraviolet light-initiated homopolymerization of the unsaturated acid or salt is a competing reaction in the one-step process.

The expression "throughout the macro-bulk" is employed to indicate thorough penetration of the nitrogen-containing polymer by the unsaturated organic acid or salt. While it is not desired to be limited by theoretical considerations, it appears probable that penetration, and hence grafting, occurs primarily in the micro-amorphous regions of the polymer and that the micro-crystalline regions are substantially less modified in the present process.

Nitrogen-containing polymers which are suitable as substrates or shapes for use in the various embodiments of the invention comprise the polycarbonamides and polysulfonamides in which nitrogen is a fundamental link in the recurring units in the polymer chain. There are thus included the polyamides, the polysulfonamides, the polyureas and the polyurethanes. Of these the polyamides are preferred.

Polyamides suitable for use in this invention are those synthetic linear polyamides which are prepared from polymerizable monoaminocarboxylic acids or their amide-forming derivatives, or from suitable diamines and suitable dicarboxylic acids, or from amide-forming derivatives of these compounds. The preferred polyamides are those wherein the intercarbonamide linkages are other than exclusively aromatic, i.e., those containing at least one aliphatic —HCR— group in each repeating unit of the polymer molecule. The —R group may be hydrogen, halogen, monovalent organic radical, alkylene or the like. Typical of such polyamides are those formed from an aliphatic diamine and an aliphatic dicarboxylic acid and containing the repeating unit —X—Z—Y—Z—, wherein X and Y represent divalent aliphatic or cycloaliphatic groups, and Z represents a

linkage. Polyhexamethyleneadipamide and polycaproamide, i.e., "66" and "6" nylons, are typical.

Other suitable polyamides are those having the repeating structure —A—Z—X—Z—, wherein A is a divalent aromatic radical and X and Z are as previously defined. Polyhexamethylene terephthalamide is illustrative of such polymers. In addition, polyamides having repeating units such as —A—Z—B—Z and —X—Z—B—Z—, wherein B is divalent alkaryl (such as xylylene), may be used. In the class of suitable polyamides containing other than aromatic intracarbonamide repeating units are those prepared from piperazine, such as those from piperazine and adipic acid, piperazine and terephthalic acid, and the like. Copolyamides, condensation polymers in which the amide linkage is the predominant linkage, and polyamide mixtures are also useful.

Polyamides which form the structures of the present invention are of a high molecular weight (i.e., they are fiber-forming and have a non-tacky surface at room temperature). As pointed out by Carothers in U.S. 2,071,253, polyamides should have a number average molecular weight of at least about 10,000 (relative viscosity, 24) to be fiber-forming. Preparation of such polyamides is illustrated in U.S. Patents 2,071,250, 2,071,253, and 2,130,948.

Polysulfonamides suitable for use in this invention may be illustrated by those polymers obtained by condensation of the following pairs of reactants: bis(p-aminocyclohexyl)methane and 4,4'-diphenyldisulfonyl chloride; hexamethylenediamine and benzene-1,3-disulfonyl chloride; 1,3-xylylenediamine and ethylenedisulfonyl chloride; tetramethylene diamine and naphthalene-2,7-disulfonyl chloride.

Polyurethanes suitable for use in this invention are polymers obtained from diisocyanates and glycols, and having repeating units of the type

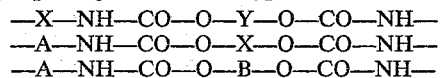
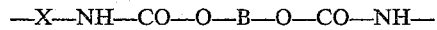

and

—X—NH—CO—O—B—O—CO—NH— wherein A, B, X, and Y are as defined above.

By "shaped structure" is meant any form which is solid at room temperature. Thus, the form may be a fiber, film or pellicle. It may be a woven, knitted or felted fabric, a paper, a bristle, or artificial straw. Alternatively, the structure may be a flake, powder or comminuted particle which may be reshaped after the grafting step to form an article of specific end use. The shape is not a critical element in the treatment, except that shapes of increased thickness require relatively greater soaking time for penetration, and shapes having at least one dimension not greater than 0.02" are preferred for optimum penetration of ultraviolet light.

Ultraviolet light suitable for use in this invention includes light with wave lengths in the range of 1500–4000 A. Within this range, more effective grafting is obtained with light in the range of 2000–3800 A. and the most efficient grafting is obtained with light in the range of 2500–3500 A. Ultraviolet light suitable for use in this invention is characterized by having a radiation intensity of at least $4 \times 10^{-3}$ watts/cm.$^2$ of plane surface, upon which effective radiation impinges. Light with lower radiation intensity than this fails to cause grafting within a practical length of time.

Grafting by means of ultraviolet light as in the present invention is preferred over processes involving high energy ionizing radiations because of the greater freedom from degradation of the nitrogen-containing polymer when ultraviolet light is employed.

The presence of a photoinitiator is not essential to the process of this invention. However, the use of a photoinitiator greatly reduces the ultraviolet light exposure required to bring about grafting. Since some nitrogen-containing polymers are somewhat degraded by excessive exposure to ultraviolet light, the use of a photoinitiator with resultant minimizing of ultraviolet exposure represents the preferred practice of the invention. The amount of photoinitiator may be suitably varied from 0.01% to 10% of the weight of the polymerizable unsaturated acid or salt to be grafted and amounts above and below this range may be employed under special circumstances.

The penetration of the photoinitiator into the nitrogen-containing polymer is conveniently carried out at the same time as the incorporation of the polymerizable unsaturated acid or salt. When the unsaturate is a liquid, it is suitable to dissolve the photoinitiator in the unsaturated compound prior to contacting the resulting solution with the nitrogen-containing polymer. When the unsaturate and the initiator are soluble in a mutual solvent, such a solution may be employed to carry out the penetration step. For this purpose, low-boiling hydrocarbons, ethers, ketones, dioxane, and the like may be employed as solvents. With certain unsaturated acids and salts, water is a suitable mutual solvent.

The penetration of the photoinitiator with or without the presence of a solvent therefor, may also be carried out independently by contacting such an initiator, in fluid form or in solution, with the nitrogen-containing polymer either before or after the penetration of the unsaturated acid or salt into the nitrogen-containing polymer.

Photoinitiators suitable for use in this invention are the initiators for addition polymerization which are activated by ultraviolet light. Suitable photoinitiators for use in this invention include vicinal dicarbonyl compounds, such as diacetyl, benzil, 2,3-pentanedione, 2,3-octanedione, 1-phenyl-1,2-butanedione, 2,2-dimethyl - 4 - phenyl-3,4-butanedione, phenylglyoxal, diphenyl triketone, etc.; aromatic diketones, such as anthraquinone; acyloins, such as benzoin and pivaloin; acyloin ethers, such as benzoin methyl ether, benzoin ethyl ether; α-hydrocarbon-substituted aromatic acyloins, including α-methylbenzoin, α-allylbenzoin and α-phenylbenzoin; diaryl ketones, such as benzophenone and dinaphthyl ketone and organic disulfides such as diphenyldisulfide.

The nitrogen-containing polymer shaped structure containing the unsaturated acid grafted by the process of this invention is characterized by a plurality of pendent acid groups which are chemically attached to the polymer chain. Such pendent acid groups are susceptible to titration, as determined by the method of G. B. Taylor and J. E. Waltz, "Analytical Chemistry," 19, 448 (1947). To obtain the advantages of this invention, it is desirable to attach, in the "macro bulk" region where modification is desired, unsaturated acid sufficient to provide at least about 300 equivalents of such titratable acid groups per $10^6$ grams of polymer (referred to the "macro bulk" region modified). These acid groups are the total of any free acid end groups derived from the polymer and those derived from the organic acid grafted thereto.

By a "polymerizable unsaturated organic acid" is meant any polymerizable organic acid and/or anhydride capable of forming a metal, an amine and ammonium salt and which contains at least one reactive unsaturated linkage, such as a vinylene or acetylene group. Since it is desirable that the acid penetrate into the shaped structure, and low molecular weight acids penetrate the shaped structure more readily, those acids with up to eight carbon atoms are preferred. However, acids with as many as 20 or more carbons in their chain are suitable to a lesser degree. It is desirable, to obtain maximum activation, that the double bond be in close proximity to the acid group. Such a configuration appears to enhance the rate of penetration of the acid into the shaped structure. Especially suitable unsaturated acids are acrylic, methacrylic, crotonic, furoic and propiolic acids. Polymerizable difunctional unsaturated acids, such as itaconic, fumaric, or 3-methyl-2-cyclobutene-1,2-dicarboxylic acid, are also very useful, as are the sulfonic acids such as styrenesulfonic acid, ethylenesulfonic acid, and the like; unsaturated alkyl or aralkyl acid phosphates, phosphites, phosphonates and phosphinates. Acid alkyl sulfates and carbonates with an unsaturated carbon-carbon bond also have utility. Of the unsaturated acids, acrylic acid and styrenesulfonic acid are especially preferred.

Because the nitrogen-containing polymer is penetrated with the polymerizable unsaturated organic acid or salt prior to grafting, modification of the shaped structure extends at least through a substantial portion of the body of the final product. Usually the acid or salt is coated upon the shaped structure or padded on as a dispersion, a solution, a pure liquid, or as an emulsion. For liquids, spraying is useful, or the polymeric article may be dipped therein. Acids may also be added as a vapor. A preferred method is to dip the nitrogen-containing polymer into a solution which contains both the polymerizable composition and the photoinitiator.

The penetration is facilitated by an affinity of the nitrogen-containing polymer for the unsaturated acid. Thus, when a nylon fabric is treated with an acrylic acid solution and excess liquid is mechanically removed, there is substantially more acid left in the nylon than might be expected. Thus, mechanically removing excess liquid before exposure to ultraviolet light increases efficiency by decreasing the loss of acid due to homopolymerization of the excess acid outside of the shaped structure.

The grafting of an unsaturated organic acid, particularly low molecular weight acids, onto and within polyamide articles is a preferred part of this invention not only because the acids penetrate the polyamide structure with unusual rapidity but also because the polyamide structure will accept an unusual amount of such foreign materials before it is saturated. Moreover, the incorporated acid can be grafted by the method described with remarkable ease such that it becomes attached to and inseparable from the polyamide.

When an unsaturated acid is employed in this invention, the grafted acid may be converted to its salt form by metathesis with a base or another salt. Calcium ion is very readily picked up by the acid-modified polymer. If two or more cations are present in the treating solution, one ion will usually be picked up in preference to the other. For example, when both sodium and calcium ions are present, the calcium salt will be formed in preference to the sodium. This is readily controlled by treating the acid-modified polymer with a solution in which calcium ion sequestrant (e.g., sodium hexametaphosphate) is included. Under those conditions of treatment, sodium ion is picked up in preference to the calcium ion. When lithium ion is substituted as the cation for sodium, similar hydrophilic and heat-resistant properties are obtained. It may at times be desirable to treat the acid-modified polymer simultaneously or consecutively with more than one species of ion to obtain multiple effects. For example, since calcium ion is very effective in improving heat resistance, after incorporating this ion throughout the body of a shaped structure, sodium ions may be attached at or near the surface (using calcium sequestrant and sodium ion) to improve the antistatic characteristics.

Among metallic salts suitable for use in the process of the present invention may be mentioned sodium carbonate, potassium carbonate, potassium acetate, calcium acetate, manganous acetate, zinc acetate, cupric acetate, cobaltous acetate, chromic acetate, and the like. Phosphate-containing detergents and even some hard waters are suitable as cation donors.

Organic cations are suitable for forming the salt of the acid-modified N-containing polymer. Any amine or quaternary ammonium compound may be employed. Among these may be mentioned ammonia, aliphatic, aromatic, cycloaliphatic and heterocyclic amines such as ethylamine, diethylamine, triethylamine, triethanolamine, guanidine, aniline, benzylamine, cyclohexylamine, piperidine, morpholine, and the like. So also the nature of the quaternary ammonium ion used in salt formation is not critical. Methylpyridinium chloride, trimethylbenzylammonium chloride, tetramethyl ammonium chloride, and the like may be used. Polyquaternary compounds such as poly(methylpyridinium)sulfate are also useful.

When the polymerizable unsaturated compound is a salt, the number of titratable ends may be determined by converting the grafted salt to the free acid form by contacting it with an aqueous acid, as is customary in ion-exchange techniques. Excess acid can be removed by washing with water. The resulting free acid form of the grafted composition may be characterized by titration of the free acid ends as indicated above.

The determination of titratable free ends represents a convenient method for observing when the minimum amount of modification of the nitrogen-containing polymers according to this invention has been achieved. It will be readily appreciated that the entire amount of any unsaturated acid grafted according to this invention may not respond to the titration. This is presumed to be caused by more or less growth of branch chains of the unsaturated compound in addition to the attachment of each original unsaturated acid molecule to the chain of the nitrogen-containing compound. Acid groups close to the chain of the nitrogen-containing polymer thus may be somewhat "buried" and may not respond to titration as readily as other similar groups at the end of such a grafted branch. It will also be appreciated that a minimum of 300 equivalents of titratable end groups per $10^6$ grams of polymer places a practical lower limit for the amount of any particular unsaturated compound required to be grafted in order to achieve the objects of this invention. In the case of acrylic acid grafted onto 66 nylon, the ungrafted nylon starting material has about 80 equivalents of titratable acid groups per $10^6$ grams of polymer. If 220 additional equivalents of acid ends are supplied by grafting of acrylic acid, and if all of the grafted acid is in the form of single unit acrylic acid branches or branches containing few acrylic acid units, all of which are titratable, the least possible amount of acrylic acid required would produce a weight gain of 1.6% in the nylon. Since the actual value of this minimum will vary with the particular nitrogen-containing polymer and unsaturated acid or salt employed, it is more feasible to express the generic minimum in terms of equivalents of titratable ends produced in the grafted product.

The grafting which occurs in this invention appears to be at the site of C—H bonds in the chain of the nitrogen-containing polymer. Much of it occurs on the carbon atom of the chain of the nitrogen-containing polymer, which is directly attached to a nitrogen atom which is also in the same chain. Thus, a substantial portion of the graft linkages are of the following type:

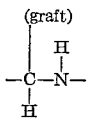

in which the grafting produces a bond between a carbon atom of the chain of the nitrogen-containing polymer and one of the two carbons of the unsaturated group in the polymerizable unsaturated acid or salt.

In the process of this invention the time elapsed between the impregnation step and the irradiation step may be varied widely. However, for practical purposes, and particularly with relatively volatile polymerizable acids or salts, it is preferred that the elapsed time should not exceed two hours. If the irradiation step precedes the impregnation, the usable interval between the two may greatly depend on the conditions of storage of the irradiated substrate. Use of a maximum two-hour interval is, however, again preferred.

The duration of the irradiation step may also be varied if a corresponding variation in the intensity of the radiation is employed. Because long exposure to high intensity ultraviolet light degrades many polymers, it is preferred that the irradiation step be completed within 90 minutes. For practical purposes, irradiation times of 30 minutes or less are preferred, and for commercial operation in continuous equipment, irradiation times of five minutes or less are most highly preferred.

The process of this invention is particularly useful for grafting unsaturated organic acids or their salts to nitrogen-containing polymers in a continuous process. The short exposure times noted in some of the Examples below, and the availability of high intensity sources of ultraviolet light, as well as the rapid penetration times, especially at elevated temperatures, for the preferred unsaturated organic acids and salts into the nitrogen-containing polymers greatly reduce the size of the process machinery needed to treat a continuous strip of film, yarn, or fabric at high speed. This is particularly true when a highly active photoinitiator, such as benzoin methyl ether, is employed.

As shown in FIGURE 2, a continuous nylon fabric 10 may be passed under rollers 23 and 24 in a tank 11 containing benzoin methyl ether dissolved in a solution of acrylic acid, the tank being of such length that the fabric is immersed in the liquid for at least five minutes. Excess liquid is removed between rollers 26 and the fabric is passed between banks of ultraviolet light sources 15 for such a distance that a ten-second exposure to ultraviolet light occurs. The fabric is then passed through a water wash tank 12 to recover excess acrylic acid, through an aqueous sodium carbonate wash tank 13 to convert grafted acid to the sodium salt form, and then through a final water wash tank 14 followed by drying by conventional means. Conventional guide rollers 21, 22, 25, and 27-44, inclusive, are of course employed as desired.

In its continuous aspect, the process of this invention is particularly well suited for the treatment of a running end of yarn, e.g., "66" nylon yarn. For example, where the unsaturated acid is compatible with conventional yarn finishes, it may be applied, along with the photoinitiator if desired, to the freshly spun yarn as a finish component. Alternatively, the composition may be applied in a separate stage of the spinning operation, prior to winding. The running end of spun yarn may then be irradiated in single or multiple passes, or preferably, the radiation may be directed onto the winding package. The latter technique will usually permit a longer exposure to irradiation at conventional spinning speeds. The exposure to unsaturated acid, e.g., acrylic acid, and/or the irradiation may be carried out in a repackaging operation intermediate between spinning and drawing.

In order to permit a longer time for the unsaturated acid to penetrate the filaments, it may be preferable to defer the irradiation step until immediately before, during, or after the drawing operation. When using volatile unsaturated acids, it will be preferable to irradiate prior to the drawing operation, since the temperatures involved during drawing are likely to volatilize the acid before it can be grafted to the substrate.

An alternative method, which avoids the chance of volatilizing the acid before grafting, is to apply the unsaturated acid to the yarn after drawing, followed by irradiation, to which the yarn may suitably be exposed while winding onto the conventional drawtwister package. An advantage of this procedure is that a given yarn element remains exposed on the surface of the winding package for a longer period of time before being buried by succeeding layers of yarn, thus increasing the available exposure time at conventional processing speeds.

Other obvious variations in technique will be apparent to those skilled in the art, such as for example impregnation of the yarn upon a package following conventional package dyeing techniques, followed by irradiation of the running end of yarn while rewinding; this technique is suitable for either drawn or undrawn yarn. It is within the scope of this invention to similarly process multiple ends of yarn, such as a rope or tow; such processing is especially useful in preparing staple. Under these conditions, it will be desirable to treat the filaments uniformly with the acid, and permit uniform penetration and irradiation. This may be suitably accomplished by spreading the filaments into a flat band or ribbon during processing.

Rate of penetration and/or grafting may often be increased by increased contact time or irradiation temperature. A high-boiling solvent for the acid is often beneficial in increasing the amount of grafting, although water is usually preferred from the viewpoint of cost and availability.

The products of this invention which contain grafted acids are much more receptive to basic dyes than the corresponding polymer substrates. The grafted acid products are also useful, per se, as ion exchange polymers for removing cations from solutions.

There follow some nonlimiting examples which illustrate the process of the invention in more detail. In these examples, the nylon fabric referred to is a taffeta fabric woven from 70 denier, 34 filaments, 66 nylon yarn and having a thread count of 112 x 72. Unless otherwise specified, parts are by weight.

EXAMPLE I

Nylon fabric (1.783 parts, conditioned to constant weight at 50% relative humidity and 23° C.) is wet out with 1 part of 25% aqueous acrylic acid containing a trace of hydroquinone inhibitor. The wet fabric is placed between two glass filter plates (Corning Filter glass code 791, color specification 9-54, ground and polished to about 2 mm. thickness). These plates transmit 25% at 2310 A., 50% at 2415 A., 75% at 2650 A., and 90% at 3320 A. and higher. The plates are sealed together at the edges with pressure-sensitive tape, and exposed for five minutes on each side in a position six inches from the burner of a Hanovia Analytic Model Ultraviolet Lamp fitted with a Type L burner. The fabric is removed and rinsed several times in water.

The grafted ends of acrylic acid are converted to the sodium salt by soaking the treated fabric in dilute sodium carbonate solution at about pH 10 for 1.5 hours. It is rinsed again in water and conditioned to constant weight at 50% relative humidity and 23° C. The weight gain caused by the grafted sodium salt of acrylic acid is 2.4%. This corresponds to about 330 titratable acid ends in the free acid form of this grafted product exclusive of the titratable ends in the substrate polymer. The product in its sodium salt form is tested for resistivity with a sensitive meter of the type described by Hayek and Chromey, Am. Dyestuff Rptr. 40, 225 (1951). The log of the resistivity (log R) is 11.5 as compared with over 13.7 for an untreated control fabric. The value 13.7 is the highest reading attainable with the meter employed. Fabrics having a log R of 12 or less do not develop static in apparel usage. Cotton has a log R of about 10.8.

EXAMPLE II

Example I is repeated except that acrylic acid containing no inhibitor is employed. The fabric in its sodium salt form shows a weight gain of 13.0% and has a log R of 9.9.

EXAMPLE III

Example I is repeated except that 1.5 parts of 25% aqueous acrylic acid containing no inhibitor is used and the exposure to ultraviolet light is carried out for 15 minutes on one side of the fabric and 24 minutes on the other. The fabric in sodium salt form shows a weight gain of 17.1% and has a log R of 11.0. Tests with a burning cigarette show that the fabric is much more resistant to hole melting than a control untreated fabric. When the grafted fabric is converted to its acid form by treatment with acetic acid, it is found to be dyeable with a basic dye. Cross-sections of the dyed fibers are uniform in color. These tests indicate that the acrylic acid is grafted throughout the whole bulk of the fiber.

EXAMPLE IV-XXIV

In these examples, nylon taffeta fabrics are employed which are like those in Examples I-III except that the fibers contain selected amounts of $TiO_2$ as follows: Fabric 7-B is a "dead bright" fabric containing 10 p.p.m $TiO_2$. Fabric 2-SD is a semidull fabric containing 0.3% $TiO_2$. Fabric 2-D is a dull fabric containing 2% $TiO_2$. The fabrics are scoured and samples 6" x 9" are employed. Dry weight is determined on these samples after thorough drying in a vacuum desiccator. In the examples employing a photoinitiator, the fabric is first impregnated by wetting the fabric with a solution of 40 mg. of the indicated photoinitiator in 2 ml. of ether. The ether is then allowed to evaporate. The fabric is next impregnated with acrylic acid by soaking it in at least 3 ml. of 25% aqueous acrylic acid (containing no inhibitor) for 30 minutes and then blotting. The padded fabric is placed on an aluminum sheet.

In Example IV the fabric is uncovered. In Examples V-XXIV, it is covered with a 1.9 mil film of high clarity polyethylene having a transmission of 64% or more for radiation of 2400 A. or longer wave length. In Examples IV and V, the fabric is irradiated by placing it 3" from an 8-watt germicidal ultraviolet lamp (G8T5), which emits mostly light at 2537 A. Under these conditions the ultraviolet light reaching the fabric has a radiation intensity of about $6.5 \times 10^{-3}$ watts/cm.$^2$. Examples VI-XXIV employ radiation from a Hanovia Analytic Model Lamp fitted with a Type L burner (output about 62 watts between 2600 A. and 3800 A.), filtered through a Corning Filter, glass code 9863, color specification 7-54, which transmits at least 57% of the radiation between 2600 A. and 3800 A., but cuts out most of the visible and infrared light and all radiation below 2200 A. The filter is located 6" below the burner, and the sample 1.7" below the filter. Under these conditions the ultraviolet light reaching the fabric has a radiation intensity of about $1.5 \times 10^{-2}$ watts/cm.$^2$. In Example XIX, the filter is omitted. The temperatures are measured with a thermocouple at the upper surface of the polyethylene cover. Fabric temperatures are probably somewhat lower. In control Examples XXI and XXII, the fabric is mounted between the aluminum sheet and polyethylene cover film and allowed to stand without radiation for five minutes and thirty minutes, respectively, before washing.

After irradiation, the fabrics are washed several times by soaking, with intermittent agitation, for thirty minutes in distilled water, the last such wash being in distilled water at 60-90° C. After the water wash, the fabrics in Examples VIII-XXIV are further washed in a solvent for the photoinitiator. In Examples VIII, XIV, and XV, the fabrics are washed successively in acetone and ether. In Examples IX-XIII and XVI-XXIV, the fabrics are washed successively in acetone and alcohol. The fabrics are then dried to constant weight in a vacuum desiccator and the dry weight gain is determined.

In Examples VII, VIII, X, XI, XIII-XX and XXIV, portions of each fabric are removed and titrated for carboxyl ends by the method of Taylor and Waltz indicated above. Control titrations on samples of fabric prior to grafting show 80 equivalents of titratable free acid groups per $10^6$ grams of polymer. The remaining fabrics containing grafted acrylic acid are then converted to the sodium salt form by soaking in aqueous sodium carbonate solution, followed by rinsing in water and drying. The percentage of sodium by weight is determined by analysis, and log R is observed with a sensitive meter as in Example I. In addition to the properties shown in the table, the treated fabrics display high wet crease recovery, high resistance to hole melting and/or much improved dyeability with basic dyes, all relative to untreated control fabrics. In particular, hole melting resistance and dyeability throughout the fiber cross-section depend on uniform graft modification of the amorphous regions throughout the polymeric substrate as distinguished from graft modification of the surface only.

EXAMPLE XXV

A 6" x 9" piece of fabric 2-SD is impregnated with benzoin methyl ether by soaking in a solution of 80 mg. of benzoin methyl ether in 2 ml. of diethyl ether for five minutes. The diethyl ether is then evaporated. The fabric is then impregnated with styrenesulfonic acid by soaking it in the dark for five hours in a solution of 0.4 g. of benzoin methyl ether in 20 ml. of styrenesulfonic acid solution (142 g./l.) containing no inhibitor. After wringing between paper towels, the padded fabric shows a weight gain of 60%. The fabric is mounted on an aluminum sheet under a polyethylene film and irradiated for five minutes in the manner of Examples VI-XXIV. The fabric is then thoroughly washed in distilled water, including a final water wash at 60-90° C. It is then rinsed in acetone to remove any remaining photoinitiator. After drying, the fabric shows a weight gain of 13.9%.

EXAMPLE XXVI

The photoinitiator and the unsaturated monomer may be incorporated in a single operation. A 6" x 9" piece of fabric 2-SD is impregnated by soaking for 30 minutes in 10 ml. of 25% aqueous acrylic acid containing 0.16 g. of benzoin methyl ether and 0.2 ml. of dioxane. After wringing between paper towels, the padded fabric shows a weight gain of 33%. The fabric is mounted on an aluminum sheet under a polyethylene film and irradiated for 10 seconds in the manner of Examples VI-XXIV. The fabric is then thoroughly washed in distilled water, including a final water wash at 60-90° C. It is then rinsed in acetone to remove any remaining photoinitiator. After drying, the fabric shows a weight gain of 11.7%.

EXAMPLES XXVII-XXXI

The effect of a delusterant, such as $TiO_2$, in distributing the absorption of radiation in the present invention is shown in a comparison of Example XX and Examples XXVII-XXXI below. In the following examples, nylon fabrics are impregnated with acrylic acid and benzoin methyl ether and irradiated in the manner of Example XX. In Examples XXVII-XXIX, the fabrics are irradiated on one side as in Example XX. In Examples XXX and XXXI, the fabrics are irradiated for the indicated time on both sides, i.e., the total exposure is twice that indicated.

*Examples IV-XXIV*

| Example | Fabric | Dry weight (g.) | Photoinitiator | Padded weight (g.) | UV radiation | | Properties of fabric in acid form | | Properties of fabric in sodium salt form | |
|---|---|---|---|---|---|---|---|---|---|---|
| | | | | | Time | Temp. (° C.) | Dry weight gain (percent) | Equivs. of free acid groups per $10^6$ g. of polymer | Na+ (percent) | Log R |
| IV | 2-SD | 1.982 | None | 2.922 | 30 min | | 0.7 | | | |
| V | 2-SD | 2.002 | do | 3.192 | 30 min | | 0.7 | | | |
| VI | 2-SD | 1.981 | do | 3.387 | 90 min | 40-52 | 4.9 | | | |
| VII | 2-SD | 1.985 | do | 3.333 | 90 min | 46-50 | 4.9 | 672 | 1.23 | 10.5 |
| VIII | 2-SD | 1.994 | Benzoin methyl ether | 3.206 | 30 min | 40-43 | 16.0 | 1,524 | 3.46 | 8.5 |
| IX | 2-SD | 1.807 | do | 2.873 | 30 min | 40-46 | 16.3 | | | |
| X | 2-SD | 1.964 | do | 3.298 | 15 min | 43-45 | 18.2 | 1,268 | 3.83 | 9.5 |
| XI | 2-SD | 1.936 | t-Butylanthraquinone | 2.930 | 30 min | 44-45 | 13.6 | 1,325 | 3.23 | 8.5 |
| XII | 2-SD | 1.981 | Dibenzyldisulfide | 3.080 | 15 min | 42-46 | 0.8 | | | |
| XIII | 2-SD | 2.003 | Benzophenone | 3.159 | 15 min | 42-45 | 16.6 | 1,249 | 3.61 | 9.5 |
| XIV | 2-D | 1.821 | Benzoin methyl ether | 2.937 | 30 min | 43-45 | 10.1 | 1,070 | 2.54 | 10.5 |
| XV | 7-B | 1.922 | do | 3.186 | 30 min | 47-48 | 17.8 | 1,862 | 3.61 | 9.5 |
| XVI | 7-B | 1.930 | do | 3.290 | 5 min | 42 | 19.0 | 1,079 | 3.76 | 9.5 |
| XVII | 7-B | 1.937 | do | 3.360 | 1 min | | 17.7 | 1,018 | 3.38 | 9.5 |
| XVIII | 7-B | 1.932 | do | 3.235 | 15 sec | | 12.3 | 887 | 2.53 | 9.5 |
| XIX | 7-B | 1.955 | do | 3.301 | 5 sec | | 15.3 | 819 | 3.10 | 9.5 |
| XX | 7-B | 1.925 | do | 3.315 | 5 sec | | 12.7 | 813 | 2.75 | 9.5 |
| XXI | 7-B | 1.930 | do | 3.299 | None | 20 | -0.5 | | | |
| XXII | 7-B | 1.936 | do | 3.180 | None | 20 | -0.5 | | | |
| XXIII | 7-B | 1.975 | Diphenylamine | 3.268 | 15 min | 42-43 | 0.1 | | | |
| XXIV | 7-B | 1.939 | Diphenyldisulfide | 3.270 | 15 min | 43 | 6.7 | 626 | 0.93 | 12.5 |

| Example | Fabric | TiO₂ (percent) | Irradiation time (sec.) | Weight gain (percent) |
|---|---|---|---|---|
| XXVII | 2-SD | 0.3 | 5 | 9.6 |
| XXVIII | 2-SD | 0.3 | 10 | 13.0 |
| XXIX | 2-D | 2.0 | 10 | 8.9 |
| XXX | 2-D | 2.0 | ¹ 5 | 9.1 |
| XXXI | 2-D | 2.0 | ¹ 10 | 10.9 |

¹ On each side.

Increasing the amount of delusterant appears to increase the proportion of the grafting which occurs in the part of each fiber nearest the radiation source. Controlled gradation of grafting of this sort permits variation in the relative dyeability of the two sides of the fiber. Also, the moisture sensitivity of the two sides of the fiber may thus be rendered different so that crimp is imparted to the fiber in the presence of moisture.

Since obvious modifications of the invention will be evident to those skilled in the art, we propose to be bound solely by the appended claims.

The embodiments of the invention in which an exclusive property or privilege is claimed are defined as follows:

1. The process of forming a graft copolymer which comprises contacting a member of the group consisting of polymerizable unsaturated organic acids and the salts thereof with a substrate shaped from a nitrogen-containing polymer of the group consisting of polyamides, polysulfonamides, polyureas and polyurethanes activated by means of ultraviolet light having a radiation intensity of at least $4\times10^{-3}$ watt/cm.², thereby chemically bonding the member of said group to the substrate.

2. The invention of claim 1 in which the polymer is in the form of a fiber.

3. The invention of claim 1 in which the polymer is in the form of a fabric.

4. The invention of claim 1 in which the polymer is in the form of a film.

5. The invention of claim 1 in which the grafting is accomplished in the presence of a photoinitiator.

6. The invention of claim 5 in which the photoinitiator is a member of the group consisting of vicinal dicarbonyl compounds, aromatic diketones, acyloins, acyloin ethers, α-hydrocarbon-substituted aromatic acyloins, diaryl ketones and organic disulfides.

7. The invention of claim 1 in which the polymer is nylon and the organic acid is an acrylic acid.

8. The invention of claim 1 in which the polymer is nylon and the organic acid is styrenesulfonic acid.

9. The process which comprises wetting a nylon yarn with a solution containing a salt of acrylic acid and subsequently irradiating the wet yarn with ultraviolet light having a radiation intensity of at least $4\times10^{-3}$ watt/cm.² to chemically bond the salt thereto.

10. The invention of claim 9 accomplished continuously.

11. The process which comprises sequentially (1) contacting a shaped nitrogen-containing polymer of the group consisting of polyamides, polysulfonamides, polyureas and polyurethanes with polymerizable unsaturated organic acid, (2) irradiating the contacting polymer and acid with ultraviolet light having a radiation intensity of at least $4\times10^{-3}$ watt/cm.² to graft the acid to the polymer, and (3) converting the acid to a salt.

12. The invention of claim 11 in which the polymer is nylon and the organic acid is an acrylic acid.

13. The process which comprises (1) wetting a nylon fabric with a solution containing acrylic acid, (2) irradiating the wet fabric with ultraviolet light having a radiation intensity of at least $4\times10^{-3}$ watt/cm.² to graft the acrylic acid thereto, (3) and then converting the acid to a salt.

14. The process of claim 13 accomplished continuously.

15. The process of forming a graft copolymer which comprises sequentially (1) activating a substrate shaped from a nitrogen-containing polymer of the group consisting of polyamides, polysulfonamides, polyureas and polyurethanes by means of ultraviolet light having a radiation intensity of at least $4\times10^{-3}$ watt/cm.² and (2) contacting the activated substrate with a member of the group consisting of polymerizable unsaturated organic acids and the salts thereof, thereby chemically bonding the member of said group to the substrate.

16. The process of forming a graft copolymer which comprises sequentially (1) contacting a substrate shaped from a nitrogen-containing polymer of the group consisting of polyamides, polysulfonamides, polyureas and polyurethanes with a member of the group consisting of polymerizable unsaturated organic acids and the salts thereof and (2) irradiating the contacting substrate and the member of said group with ultraviolet light having a radiation intensity of at least $4\times10^{-3}$ watt/cm.², thereby chemically bonding the member of said group to the substrate.

References Cited in the file of this patent

UNITED STATES PATENTS

| | | |
|---|---|---|
| 2,253,146 | Spanagel | Aug. 19, 1941 |
| 2,647,080 | Joyce | July 28, 1953 |
| 2,649,435 | Stanin et al. | Aug. 18, 1953 |
| 2,657,191 | Coover et al. | Oct. 27, 1953 |
| 2,661,331 | Howard | Dec. 1, 1953 |
| 2,873,240 | Miller | Feb. 10, 1959 |
| 2,875,092 | Cline | Feb. 24, 1959 |
| 2,907,675 | Gaylord | Oct. 6, 1959 |
| 2,912,759 | Schlesinger | Nov. 17, 1959 |
| 2,999,056 | Tanner | Sept. 5, 1961 |

FOREIGN PATENTS

| | | |
|---|---|---|
| 750,923 | Great Britain | June 20, 1956 |

OTHER REFERENCES

Martin: Chem. and Eng. News, vol. 33, No. 14, April 4, 1955, pp. 1424–1428.

Modern Plastics, September 1957, pages 171 and 172.